July 22, 1941.  J. BRUCK  2,250,355
PACKING FOR INSULATORS IN SPARKING PLUGS
Filed Aug. 8, 1939
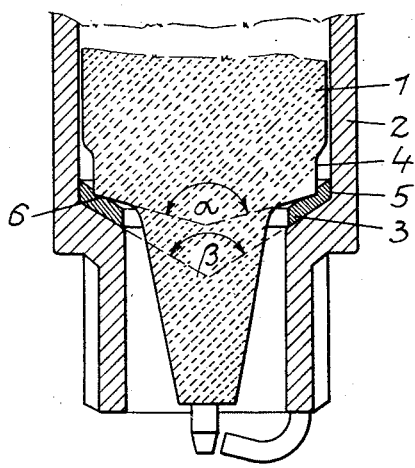

Patented July 22, 1941

2,250,355

UNITED STATES PATENT OFFICE 2,250,355

PACKING FOR INSULATORS IN SPARKING PLUGS

Josef Bruck, Tabor, Bohemia

Application August 8, 1939, Serial No. 289,031
In Czechoslovakia June 8, 1937

2 Claims. (Cl. 123—169)

The subject-matter of the invention consists of an improved packing for the insulator in a sparking plug.

Various kinds of these packings are known, which consist essentially in that the insulator of the sparking plug is pressed into a packing support which consists either of copper and asbestos or simply of soft metal. The seating surfaces for rendering tight the insulating insert in the metallic casing are conically inclined in relation to the main axis of the sparking plug, so that the conical seating surfaces on the insulator lie against the resilient support which is carried in the conical seating of the metal casing of the sparking plug.

The pressure necessary for rendering the plug gas-tight, by means of which the insulating insert is pressed into the packing support, is however limited by the rigidity of the insulating material used.

The inclination of the conical seating surfaces is not parallel for this reason, but so chosen that the seating surface of the insulator, when rendering tight, is only partly supported, the specific packing pressure being thereby increased. Up till now the inclination on the insulator and on the packing seat was chosen in such a manner that the insulator was seated upon the inner edge of the packing support. This procedure has however the disadvantage that dangerous shearing stresses arise near the inner part of the seating surfaces and the tightness of the sparking plug is achieved by the contact of only two surfaces and is therefore not complete in all cases.

By means of the packing of the sparking plug according to the present invention, not only are the above-mentioned disadvantages of the known arrangement avoided, but an extraordinarily good and reliable packing sparking plugs is provided which in no way deteriorates with axial displacement of the insulator in relation to the casing.

The essence of the invention consists in that the lower conical seating surface on the insulating insert, which lies against the packing support, has a greater apex angle than the conical seating surface on the metal casing of the sparking plug. A further feature of the invention consists in that the external diameter of the conical seating surface on the insulator is smaller than the diameter of the packing support which is arranged in the metal casing to render it tight, so that the tightening pressure presses the insulator, with the peripheral outer edge of its conical seating surface and with a part of this conical seating surface, into the packing support.

In the accompanying drawing an embodiment of the method of packing a sparking plug according to the present invention is illustrated in axial longitudinal section through the lower portion of the sparking plug.

The insulator 1 of the sparking plug is carried in a metal housing 2. The packing is effected by the arrangement of each conical seating surface with different apex angles on the insulator and on the casing in such a manner that on the insulator the angle $\alpha$ is larger than the angle $\beta$ on the casing. In this conical space a packing insert 3 of soft metal is placed.

The external diameter 4 of the conical seating surface on the insulator 1 is smaller than the diameter 5 of the packing insert 3 which is tightly secured in the metal casing 2.

By the action of the tightening pressure the edge 6 and a part of the external seating surface of the insulator 1 is pressed into the packing support 3. By reason of the influence of the packing pressure, the packing support of soft metal surrounds (flows around) the insulator at the periphery of the seating edge 6, with plastic deformation.

The axial displacement of the casing in relation to the insulator produced by the influence of heat has no influence on the completeness of the tightness since complete contact of the seating surfaces is ensured in a radial as well as in an axial direction.

What I claim is:

1. A packing construction for the insulator in a sparking plug comprising a metal casing having a conical seat, a packing disposed on said seat and a lower conical seating surface on said insulator lying against said packing having a larger apex angle than the apex angle of the surface of said conical seat.

2. A packing construction for the insulator in a sparking plug comprising a metal casing having a conical seat, a packing disposed on said seat, a lower conical seating surface on said insulator lying against said packing having a larger apex angle than the apex angle of the surface of said conical seat, and the external diameter of said seating surface being smaller than the diameter of said packing so that when said insulator is pressed into said packing a portion of said seating surface and the outer peripheral edge of said seating surface is embedded in said packing.

JOSEF BRUCK.